(12) United States Patent
Harda

(10) Patent No.: US 9,612,322 B2
(45) Date of Patent: Apr. 4, 2017

(54) SYSTEM AND METHOD FOR DETERMINING A POSITION OF A LIVING BEING IN A VEHICLE

(71) Applicant: VOLVO CAR CORPORATION, Gothenburg (SE)

(72) Inventor: Peter Harda, Torslanda (SE)

(73) Assignee: Volvo Car Corporation, Gothenburg (SE)

( * ) Notice: Subject to any disclaimer, the term of this patent is extended or adjusted under 35 U.S.C. 154(b) by 403 days.

(21) Appl. No.: 14/280,826

(22) Filed: May 19, 2014

(65) Prior Publication Data
US 2014/0347209 A1    Nov. 27, 2014

(30) Foreign Application Priority Data

May 27, 2013  (EP) .................................... 13169324

(51) Int. Cl.
| | |
|---|---|
| *G01S 13/06* | (2006.01) |
| *B60R 21/015* | (2006.01) |
| *G01S 7/41* | (2006.01) |
| *G01S 13/524* | (2006.01) |
| *G01S 13/56* | (2006.01) |

(52) U.S. Cl.
CPC ............ *G01S 13/06* (2013.01); *B60R 21/015* (2013.01); *G01S 7/415* (2013.01); *G01S 13/524* (2013.01); *G01S 13/56* (2013.01)

(58) Field of Classification Search
CPC ........ G01S 13/06; G01S 13/56; G01S 13/524; G01S 7/415; B60R 21/015
USPC ............................................. 342/146, 27, 28
See application file for complete search history.

(56) References Cited

U.S. PATENT DOCUMENTS

| | | | | |
|---|---|---|---|---|
| 5,802,479 A | * | 9/1998 | Kithil ..................... | B60N 2/002 |
| | | | | 257/295 |
| 5,943,295 A | * | 8/1999 | Varga ..................... | G01S 15/04 |
| | | | | 280/735 |

(Continued)

FOREIGN PATENT DOCUMENTS

| | | | | |
|---|---|---|---|---|
| EP | 2472289 | | 7/2012 | |
| EP | 2808693 A1 | * | 12/2014 | ............. G01S 13/06 |

OTHER PUBLICATIONS

Extended European Search Report for EP 13169324.4, Completed by the European Patent Office, Dated Nov. 11, 2013, 6 Pages.

*Primary Examiner* — John B Sotomayor
(74) *Attorney, Agent, or Firm* — Brooks Kushman P.C.

(57) ABSTRACT

A system for determining a position of a living being in a vehicle interior includes at least three components, each component of a first type or a second type, one of the first or second type being a transmitter and the other a receiver. Two components are of the first type and one component is of the second type. Each component is adapted to transmit or receive a signal dependent on type. The signal is adapted for determining a presence of the living being and for determining a distance ($d_1$, $d_2$) between the living being and each component of the first type. The components have active sectors adapted to at least partly overlap within the vehicle interior. The components of the first type are located at different positions known relative to each other. The system is adapted to determine the living being position based on the determined distances ($d_1$, $d_2$).

20 Claims, 10 Drawing Sheets

(56) References Cited

U.S. PATENT DOCUMENTS

| | | | | |
|---|---|---|---|---|
| 6,026,340 | A * | 2/2000 | Corrado | B60N 2/002 |
| | | | | 280/735 |
| 6,029,105 | A * | 2/2000 | Schweizer | B60N 2/002 |
| | | | | 280/734 |
| 6,113,137 | A | 9/2000 | Mizutani et al. | |
| 6,397,136 | B1 * | 5/2002 | Breed | G01S 15/04 |
| | | | | 180/273 |
| 7,164,117 | B2 * | 1/2007 | Breed | B60R 21/01516 |
| | | | | 250/208.1 |
| 8,566,148 | B2 | 10/2013 | Karner | |
| 2003/0125855 | A1 * | 7/2003 | Breed | G06K 9/00832 |
| | | | | 701/36 |
| 2003/0184065 | A1 | 10/2003 | Breed et al. | |
| 2007/0193811 | A1 * | 8/2007 | Breed | B60R 21/01536 |
| | | | | 180/271 |
| 2008/0037803 | A1 * | 2/2008 | Breed | H04R 5/02 |
| | | | | 381/86 |
| 2008/0048887 | A1 | 2/2008 | Aoki et al. | |
| 2008/0143085 | A1 * | 6/2008 | Breed | B60R 21/01516 |
| | | | | 280/735 |
| 2008/0157510 | A1 * | 7/2008 | Breed | B60N 2/002 |
| | | | | 280/735 |
| 2009/0297041 | A1 * | 12/2009 | Nagamine | G06T 7/0042 |
| | | | | 382/209 |
| 2010/0321184 | A1 | 12/2010 | Dreuillet et al. | |

* cited by examiner

SYSTEM AND METHOD FOR DETERMINING A POSITION OF A LIVING BEING IN A VEHICLE

CROSS-REFERENCE TO RELATED APPLICATIONS

This application claims foreign priority benefits under 35 U.S.C. §119(a)-(d) to European patent application number EP 13169324.4 filed May 27, 2013, which is incorporated herein by reference in its entirety.

TECHNICAL FIELD

The present disclosure relates to a system for determining a position of a living being in an interior of a vehicle. The disclosure further relates to a vehicle comprising such a system and a method for determining a position of a living being in an interior of a vehicle.

BACKGROUND

In a vehicle, it may be of interest to determine the presence and/or position of a living being in an interior of the vehicle. This may e.g. be used when paying fees or tickets for the vehicle, wherein the costs depend on the number of persons in the vehicle. On some roads, there may be a special lane for vehicles comprising at least two persons. The information regarding presence of the persons may then be used to check that the vehicle fulfils a requirement for a minimum number of persons. Further, the information about the position of the living being may be used in safety systems of the vehicle, e.g. a safety arrangement may only be applied if there is a person in the seat. Other safety arrangements may only be applied if that person is correctly positioned in relation to the safety arrangement, e.g. the person is not leaning forward.

Document EP 2 472 289 B1 discloses a device and method for levying vehicle tolls depending on the number of passengers in a vehicle. The system uses a Doppler radar or UWB-IR, ultra-wideband impulse radar. The radar signal is used to determine heart beating or breathing of the passengers. A first embodiment discloses the use of one radar unit. Information about the different passengers is provided by signal analysis of the reflected radar signal, wherein different signal patterns are associated with the different persons. In a second embodiment, there is one radar unit directed towards each seat, such that the presence or non-presence of a passenger in each seat may be determined.

The first embodiment of EP 2 472 289 B1 determines the number of passengers, but not their positions. The second embodiment of EP 2 472 289 B1 determines the presence or non-presence of a living being for each one of a plurality of vehicle seats. However, one radar unit is utilized for each seat, i.e. for a vehicle with five seats, five radar units are utilized and for vehicle with seven seats, seven radar units are utilized, etc.

SUMMARY

The object of the present disclosure is to overcome or ameliorate at least one of the disadvantages of the prior art, or to provide a useful alternative.

It is desirable to provide a system and a method for determining a position of a living being in an interior of a vehicle.

It is further desirable to provide a system and a method, wherein the same components may be used to determine positions of more than one living being in the interior of a vehicle. In particular, the number of living beings, whose positions are to be determined, may be higher than the highest of the number of transmitters or the number of receivers of the system.

The object above may be achieved by the subject-matter of claim 1.

Thus, in a first aspect of the present disclosure there is provided a system for determining a position of a living being in an interior of a vehicle. The system comprises at least three components, each one of the at least three components being of a first component type or a second component type, one of the first or second component type being a transmitter and the other being a receiver. Two of the components are of the first component type and one of the components is of the second component type. Each of the at least three components is adapted to transmit or receive a signal dependent on component type. The signal is adapted for determining a presence of the living being and for determining a distance between the living being and each one of the components being of the first component type. The at least three components have active sectors, which are adapted to at least partly overlap within the interior of the vehicle. The components of the first component type are located at different positions, which positions are known relative to each other. The system is adapted to determine the position of the living being based on the determined distances.

The system may be sold as a separate unit. It may be fitted into a vehicle. As an alternative, the system may already be mounted in a vehicle, when the vehicle is sold.

The two components being of the first component type are located at different positions when in use, i.e. when signals are transmitted and received. However, when being manufactured, shipped or stored, they may be located next to each other.

The living being may be a human being or an animal. It may be and adult, a large child, a small child or an infant.

The presence of the living being may be determined by determining a movement, e.g. a single movement of the body such as leaning forwards or to the side, or a repetitive moment, such as breathing or heart beating. Also dead objects may move, e.g. due to acceleration, turning or braking of the vehicle, but such movements may be distinguished from those of living beings by the nature of the movements and/or taking the vehicle dynamics into account. Vehicle movements may be determined by one or more sensors, such as an accelerometer or an angular rate sensor. Purely as an example, if detecting a repetitive movement having a frequency which is reasonable for breathing or heart beating, it is probable that the repetitive movement is associated with a living being.

The at least three components comprise two transmitters and one receiver, or, as an alternative, one transmitter and two receivers. By using two components of the first component type, which are spaced form each other, the system is arranged such that the signal may follow, at least partly, two different signal paths.

The distance may be determined as the distance from the transmitter(s) to the object, by which the signal is reflected, and/or from the object to the receiver(s).

For example, if using two transmitters and one receiver, a signal may be sent from each one of the transmitters and the signals may be reflected, e.g. by an object in the vehicle interior, back to the receiver. Since two transmitters are used, the signals follow two different signal paths to the object, although the signal paths from the object to the receiver coincide. The distances from the transmitters to the object will differ, but the distance from the object to the receiver will be the same.

As another example, if using one transmitter and two receivers, a signal may be sent from the transmitter and the signal may be reflected, e.g. by an object in the vehicle interior, back to the two receivers. Since two receivers are used, the signals follow two different signal paths from the object, although only one signal may be sent from the transmitter. The distance to the object will be the same, but the distances from the object to the receivers will differ.

As a further example, two transmitters and two receivers may be used, e.g. arranged in pairs comprising one transmitter and one receiver, with the pairs being spaced from each other. The signals will then follow two different signal paths both to and from the object. The distance to the object will differ and the distance from the object to the receivers will also differ.

As other examples, three, four or more components of the first component type may be used and one, two, three, four or more components of the second component type may be used.

To conclude the different examples: The system according to the present disclosure is arranged such that at least two different signal paths may be followed from the transmitter(s) to the object and/or from the object to the receiver(s). The signal paths may, at least partly, coincide. Normally, the at least two signal paths have different lengths, even if it is from a geometrical point of view is possible that the two signal paths have the same length.

The minimum number of components of the system is thus three: either one transmitter and two receivers, which receivers are spatially separate from each other, or, as an alternative, two transmitters, which are spatially separate from each other, and one receiver.

Each transmitter and receiver has its respective active sector. For a transmitter, the active sector is the sector, wherein the signal is transmitted. Similarly, for a receiver, the active sector is the sector from which a signal may be received. The active sector may have a three-dimensional shape, e.g. a cone-shape. The active sector of the transmitter, or transmitters, at least party coincide with that of the receiver, or receivers, such that the receiver can receive a signal sent by the transmitter, which is reflected by an object in the vehicle interior.

The reflection normally occurs in an interface, where the materials on either side of the interface have different transmission coefficients. The materials may differ as regards dielectric or magnetic permeability properties. There may e.g. be a reflection at an interface between air and a human body. There may also be a reflection at an interface between air and a vehicle seat. There may further be a reflection in the interface between the human body and the seat. There may also be reflections inside the human body, e.g. at a wall of a heart.

If the object, by which the radar signal is reflected, makes a movement, it will be seen by a change of the distance of the signal path. The movement may be a single movement, e.g. the living being leaning forward, or a repetitive movement, such as heart beating or breathing of the living being. Purely as an example, if the living being leans forward, the distance to a transmitter and/or a receiver located at a front of the vehicle will be shorter. If the movement is repetitive, the reflected signal may comprise information about the frequency, amplitude and or general curve shape of the repetitive movement. Such information may e.g. be provided by evaluating a Doppler shift of the signal. The information contained in the reflected signal will help to determine if the signal is reflected by a living being or a dead object. Further, the information may be used to distinguish between different kinds of living beings, such as a person and an animal, or between an adult and a child. The determined reflection comprising information about the movement will also comprise information about a distance associated with that movement.

The distance to the object, by which the signal is reflected, may e.g. be determined by means of the propagation time of the signal from the transmitter to the object and to the receiver. The system may be able to synchronize transmission and reception of the signal, or the signal may itself comprise time information.

The position of the living being is determined in relation to the components being of the first component type. When the positions of the components being of the first component type are known in relation to the vehicle, the position of the living being may be determined in relation to the vehicle.

If using two components of the first component type, the position may be determined in two dimensions. If using three components of the first component type, the position may be determined in three dimensions. If using more than three components of the first component type, the position may be determined in three dimensions with improved accuracy or with redundancy.

The signal may be an electromagnetic signal, such as a radar signal. Alternatively, an ultra-sonic signal may be used.

As mentioned above, the system may comprise a fourth component being of the first component type, i.e. there may be three receivers or three detectors, the components being of the first component type being located at different positions, which are known relative to each other. There will then be three different signal paths, which at least partly differ.

The relative positions of the components being of the first component type may be selected such that a distance between them is at least 10 cm, preferably at least 30 cm, more preferably at least 50 cm and most preferably at least 100 cm. If using two components of the first component type, the may be located at or adjacent to the corners of the front end of the vehicle interior. The component being of the second component type may then be located in the centre of the front end of the vehicle interior, which is suitable if only using one component of the second component type. As an alternative, the components may be located at a rear end of the vehicle interior, or at both the front end and the rear end of the vehicle interior.

The signal may be adapted for determining a distance in the range of 0.2-3 meters or in the range of 0.5-3 meters, wherein the lower limit of 0.2 meters may be suitable for determining a position of a child in a rearward-facing child seat. This is suitable for the above-mentioned location of the components at the front or the rear end of the vehicle interior.

The active sector of the components may be adapted to comprise at least 50% of the seats of the vehicle, preferably at least 70% and most preferably at least 90%. It is preferable that the active sector at least covers the positions where it is most likely to find a living being. Hence, the active sector of a component may cover more than one seat. This makes it possible to use a smaller number of the components being of the first component type than the number of seats in the vehicle and yet be able to determine a living being in each seat.

The active sector of the components may be adapted to comprise at least 30% of the volume of the vehicle interior, preferably at least 50% and most preferably at least 70%. There are some regions in the vehicle interior, wherein it is unlikely that a human being is located, e.g. directly below the roof, and these may be skipped. If not covering the whole volume of the vehicle interior, it is preferred to at least cover the positions where it is most likely to find a living being, i.e. in the seats.

The system may comprise a first transceiver comprising at least one component of each one of the first and second component type, and a second transceiver also comprising at least one component of each one of the first and second component type, the second transceiver having a known position relative to the first transceiver.

The system may be adapted for determining positions for at least two different living beings in the interior of a vehicle, the two different living beings being differentiated by their different movements.

In a second aspect of the present disclosure, there is provided a vehicle comprising a system as described above.

In a second aspect of the present disclosure, there is provided a method for determining a position of a living being in an interior of a vehicle, the method comprising:
  a) transmitting a first signal into the interior of the vehicle;
  b) receiving a first reflected signal from a first object;
  c) determining whether or not the first object is a living being based on the first reflected signal;
  d) associating the first object with a first distance;
  e) receiving a second reflected signal from a second object, the second reflected signal at least partly following another signal path than the first reflected signal;
  f) determining whether or not the second object is a living being based on the second reflected signal;
  g) associating the second object with a second distance;
  h) comparing the second reflected signal to the first reflected signal;
  i) from the comparison determining whether the living being of the second reflected signal is the same as the living being of the first reflected signal;
  j) if the same, using the first and second distances for determining the position of the living being.

The method may be performed continuously or intermittently by starting again from step a).

The second reflected signal may emanate from a second signal transmitted from another position than the first signal is transmitted, e.g. by using two transmitters which are spatially separated. A first and a second signal may be transmitted with a time difference from one or two different transmitters. The first and second signals may have different frequencies.

As an alternative, or in addition, the second reflected signal may be received in another position than the first reflected signal is received, e.g. by using two receivers which are spatially separated.

The method may be performed in a system according to above. The signal(s) may be transmitted by a transmitter or a transceiver as described above. The first and second reflected signals may be received by a receiver or a transceiver as described above.

The steps relating to the second reflected signal, steps e)-g) may be performed in parallel to the steps relating to the first reflected signal, steps b)-d), or after the steps relating to the first reflected signal, b)-d). The signal path of the first reflected signal is, at least partly, different from that of the second reflected signal. They may differ as regards the paths followed from the transmitter, to the object, if two transmitters, and/or from the object to the receivers, if two receivers are used. The signal paths may, at least partly, coincide. See examples given above. Normally, the two signal paths have different lengths, even if it is from a geometrical point of view possible that the two signal paths have the same length.

Step d) may be performed before step c). Likewise, step g) may be performed before step f). Step g) may also be performed after steps h) and i).

When determining the position of the living being in step j) it may be further be checked that the determined position is located in the interior of a vehicle and/or checked that it is located within the active sectors of the transmitter/s and the receiver/s.

The above method describes that the respective distances between the components being of the first component type and the living being are determined and thereafter used for the determining of the position of the living being. This is an example of trilateration, i.e. the process of determining absolute or relative locations of points by measurement of distances, using the geometry of circles, in two dimensions, or spheres, in three dimensions.

Step c) and step f) may be performed by determining if there is a movement associated with the first/second object and step h) in that case performed by comparing the movement associated with the first object to the movement associated with the second object. If the reflected signal is associated with a determined movement, there will also be an associated distance saying at which distance from the transmitter and/or receiver the movement occurred. The movement may be a single movement or a repetitive movement as explained above.

More than one pair of corresponding first and second objects may be determined, each pair being associated with a living being, the determining of the position of the living being of each pair being performed by using the first and second distances being associated with the first and second objects of that pair. For example, there may be two pairs of corresponding movements associated with two different persons being in the vehicle. The number of pairs may be the same as the number of persons in the vehicle.

The determined position of the living being, or the positions of the living beings if more than one, may be used to determine if a vehicle seat of is occupied or not. This may e.g. be used when paying fees or tickets for the vehicle, wherein the costs depend on the number of persons in the vehicle. On some roads, there may be a special lane for vehicles comprising at least two persons. The system, and/or the method, may then be used to check that the vehicle fulfils a requirement for a minimum number of persons.

If using two components of the first component type, i.e. a second signal is transmitted from another position than the first signal is transmitted and/or the second reflected signal is received in another position than the first reflected signal is received, the position may be determined in two dimensions.

The method may comprise a further step of assuming a plane of the vehicle, especially in the case of using two components of the first component type. The position of the living being is then determined as its projection on the plane. The plane may be determined by the level of the vehicle seats. Alternatively, the plane may be determined relative to reference points of the vehicle seats, which are defined by the positioning of a manikin as defined by the Society of Automotive Engineers (SAE). As another alternative, the plane may be given by plane going through the at least three components. In the embodiment with two transceivers, the plane may be a horizontal plane through the two transceivers. A projection on the plane, resulting in a two-dimensional position on that plane, will differ from the real position given in three dimensions. However, the projection will give an estimate, which for many applications is sufficient, especially when having in mind that it is most likely that the person will be located in one of the seats.

In addition to, or as a complement to, assuming a plane, it may be assumed that the living being is located in one of the vehicle seats. It may then be checked for which seat the determined distances fit best.

The method may further comprise:

k) receiving a third reflected signal from a third object, the third reflected signal at least partly following another signal path than the first reflected signal and the second reflected signal;

l) determining whether or not the third object is a living being based on the third reflected signal;

m) associating the third object with a third distance;

n) comparing the third reflected signal to the first reflected signal and the second reflected signal;

o) from the comparison determining whether the living being of the third reflected signal is the same as the living being of the first reflected signal and the second reflected signal;

p) if the same, using the first, second and third distances for determining the position of the living being.

The steps k)-m) relating to the third reflected signal may be performed in parallel to the steps relating to the first reflected signal, steps b)-d), and/or the steps relating to the second reflected signal, steps e)-g). Alternatively, the steps relating to the third reflected signal k)-m) may be performed after the steps relating to the first reflected signal b)-d), and/or second reflected signal e)-g).

Step m) may be performed before step l). Step m) may also be performed after steps n) and o).

If using three different reflected signals, the steps of comparing the first and second reflected signals and determining a position from that, steps h)-j), may be omitted, such that the comparison is made in one step for all three signals.

If only two of the reflected signals correspond, the method described above for the embodiment with two reflected signals may be used or the steps relating to the non-corresponding signal may be repeated.

If using three components of the first component type, the position may be determined in three dimensions. If using more than three components of the first component type, the position may be determined in three dimensions with improved accuracy or with redundancy.

In a fourth aspect of the present disclosure, there is provided a use of a system according to above to determine a position of a living being in an interior of a vehicle.

In an embodiment of the use, the same components may be used to determine positions of more than one living being in an interior of a vehicle. In particular, the number of living beings, whose positions are to be determined, may be higher than the highest of the number of transmitters or the number of receivers.

BRIEF DESCRIPTION OF THE DRAWINGS

The present disclosure will hereinafter be further explained by means of non-limiting examples with reference to the appended drawings wherein.

Figure 1:
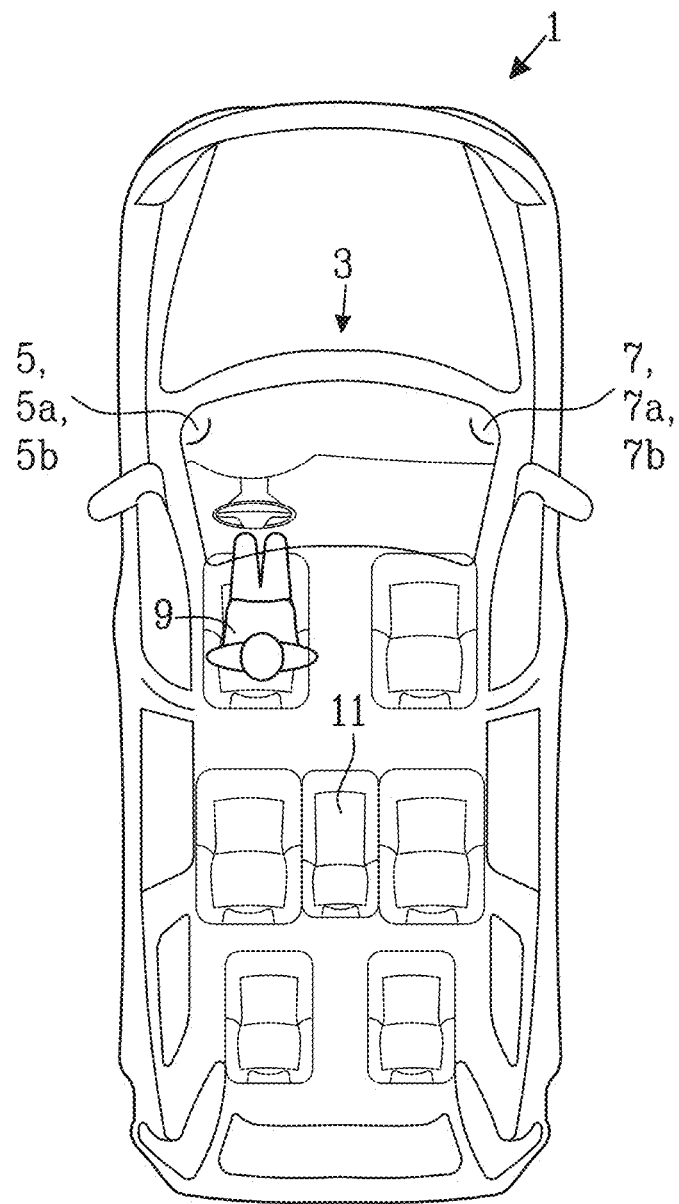
FIG. 1 is a schematic view of a vehicle comprising a system according to the disclosure.

It should be noted that the appended drawings are not necessarily drawn to scale and that the dimensions of some features of the present disclosure may have been exaggerated for the sake of clarity.

DETAILED DESCRIPTION

The disclosure will, in the following, be exemplified by embodiments. It should however be realized that the embodiments are included in order to explain principles of the disclosure and not to limit the scope of the disclosure, defined by the appended claims. Details from two or more of the embodiments may be combined with each other. The figures are schematic and simplified for clarity and merely show details for understanding the disclosure. Throughout the disclosure, like reference numerals have been used to represent identical or corresponding parts.

Figure 2:
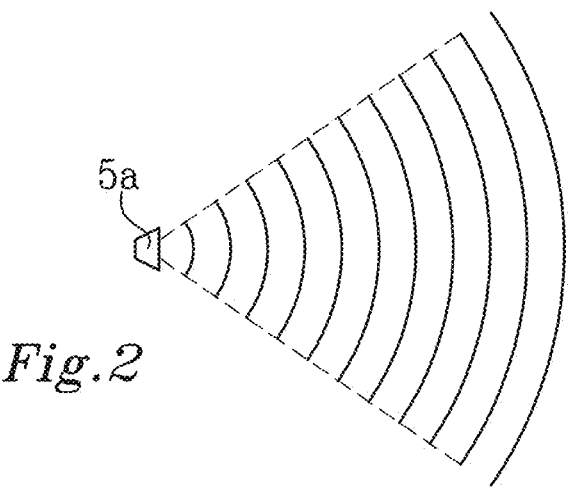
FIG. 2 illustrates an active sector of a transmitter.
Figure 3:
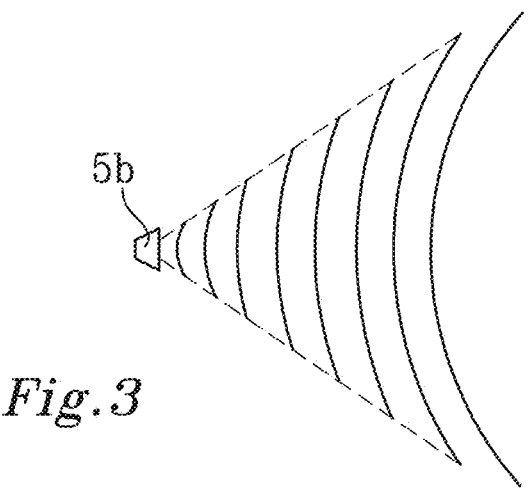
FIG. 3 illustrates an active sector of a receiver.

FIG. 1 schematically illustrates a vehicle 1 comprising a system 3 according to the disclosure. The system comprises a first radar unit 5 and a second radar unit 7. Each of the radar units 5, 7 comprises a transmitter 5a, 7a and a receiver 5b, 7b. Each transmitter 5a, 7a and each receiver 5b, 7b has its respective active sector. For a transmitter 5a, 7a, the active sector is the sector, wherein the radar signal extends. See FIG. 2. Similarly, for a receiver 5b, 7b the active sector is the sector, from which a radar signal may be received. See FIG. 3. The active sector has a three-dimensional shape, e.g. a cone-shape. The active sector of the transmitter 5a, 7a at least party coincide with that of the receiver 5b, 7b of the same radar unit, such that the receiver 5b, 7b can receive a signal sent from the transmitter 5a, 7a, which is reflected by an object 9, 11 in the vehicle interior. The object may be a living being 9, such as a user of the vehicle 1. The object may also be a dead object, such as a seat 11. In addition, the active sectors of the transmitter and receiver of the first radar unit 5 and the second radar unit 7 overlap, such that the object may be detected by each of the radar units 5, 7.

The positions of the radar units 5, 7 in relation to the rest of the vehicle 1 are known in the embodiment of FIG. 1, wherein the radar units 5, 7 are located in the front corners of the vehicle interior. Preferably, the active sectors of the transmitters 5a, 7a and receivers 5b, 7b cover most of the vehicle interior. In particular, it is preferred that the active sectors at least substantially cover the vehicle seats, i.e. the positions where it is most likely to find a living being 9.

There is at least a partial overlap between the active sectors of the respective radar units 5, 7.

The radar signal is reflected back to the receiver 5b, 7b by different objects in the interior of the vehicle 1, e.g. by the living being 9 or the object 11. The reflected radar signal comprises information about the distance to the object, by which the radar signal is reflected, e.g. as determined from the propagation time. The distance may be determined as the distance from the transmitter 5a, 7a to the object 9, 11, by which the signal is reflected, and/or from the object 9, 11 to the receiver 5b, 7b.

If the object, by which the radar signal is reflected, makes a movement, it may be identified by a change of the distance. The movement may be a single movement, e.g. the living being 9 leaning forward, or a repetitive movement, such as heart beating or breathing of the living being 9. The reflected radar signal may comprise information about the nature of the movement, such as frequency of the movement, its amplitude and/or its general curve shape. The information contained in the reflected signal will help to determine if the signal is reflected by a living being 9 or a dead object 11. Further, the information may be used to distinguish between different kinds of living beings, such as a person and an animal, or between an adult and a child. The determined reflection comprising information about the movement will also comprise information about a distance associated with that movement.

If a second person is present in the vehicle, there may also be a reflection at that person, with the associated movement and distance of the second person. The nature of the movement will differ from person to person. If a third person is present in the vehicle, there may also be a reflection at that person, having its associated movement and distance etc.

Reflected signals recorded by the two receivers 5b, 7b of the two radar units 5, 7 are compared to each other. If a corresponding movement is found in the reflected signal of the first radar unit 5 and in the reflected signal of the second radar unit 7, it is concluded that the two reflected signals have been reflected by the same living being 9. There are then two associated distances, a first distance for the first radar unit 5 and a second distance for the second radar unit 7.

Figure 4A:
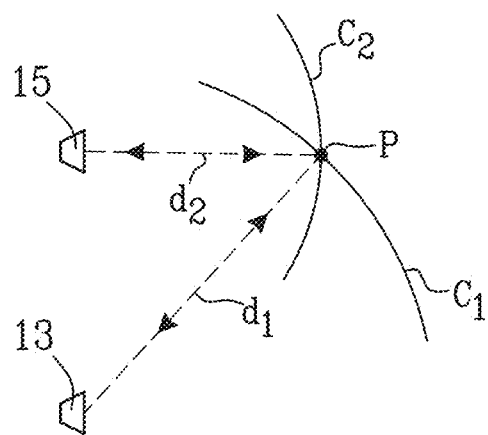
FIG. 4a illustrates a method of determining a position in two dimensions.

FIG. 4a schematically illustrates the geometry used in a method of determining a position P in two dimensions. FIG. 4a illustrates an embodiment utilizing two transceivers 13, 15, as in the vehicle of FIG. 1. The first transceiver 13 transmits a signal, which is reflected by an object located in the position P. The reflected signal is received by the first transceiver 13. The system determines that there is a first distance $d_1$ between the object located in the position P and the first transceiver 13. In this case, the distance $d_1$ from the first transceiver 13 to the position P will be the same as the distance from the position P to the first transceiver 13.

Similarly, the second transceiver 15 transmits a signal, which is reflected by an object located in the position P. The reflected signal is received by the second transceiver 15. The system 3 determines that there is a second distance $d_2$ between the object located in the position P and the second transceiver 15. In this case, the distance $d_2$ from the second transceiver 15 to the position P will be the same as the distance from the position P to the second transceiver 15.

The two distances, $d_1$ and $d_2$, are represented by circles C1, C2 in FIG. 4a, where the two distances, $d_1$ and $d_2$, constitute the radius of the circles C1, C2. The position P is located where the circles C1, C2 intersect each other. Thereby, the point P has the distance $d_1$ to the first transceiver 13 and the distance $d_2$ to the second transceiver 15.

From a geometrical point of view, the two intersecting circles C1, C2 will also have another intersection point. However, that other intersection point is located behind the transceivers 13, 15, i.e. to the left of FIG. 4a, and is therefore not possible for a position located in the interior of a vehicle and not located within the active sectors of the transceivers 13, 15. By using circles C1, C2, the position P is determined in two dimensions. If a third transceiver having its corresponding circle would be used, not illustrated, the third circle would in a two-dimensional geometry intersect the other two circles C1, C2 at one position, the point P.

Figure 5:
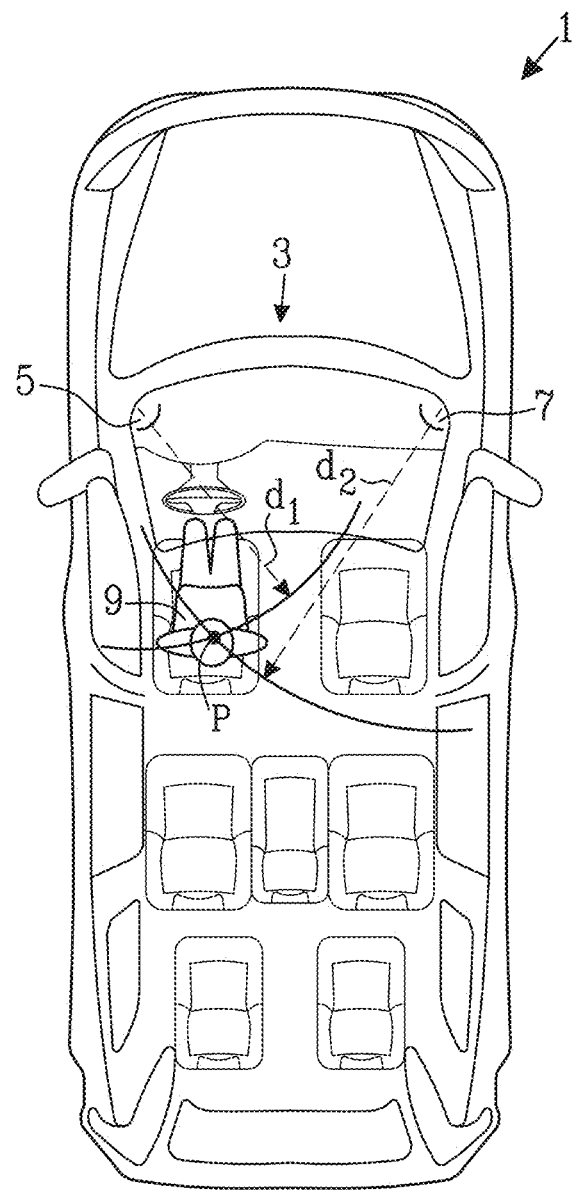
FIG. 5 illustrates the method of FIG. 4a applied in the vehicle of FIG. 1, and FIG. 6a-b illustrate a method of determining a position of in three dimensions.

FIG. 5 illustrates the geometry of FIG. 4a applied in the vehicle 1 of FIG. 1. If using the two transceivers 5, 7 of the vehicle 1 of FIG. 1 as illustrated in FIG. 5, the distance from the transmitter 5a, 7a to the position P, where the object 9 is located, is the same as the distance from the position P to the receiver 5b, 7b. The two distances, $d_1$ and $d_2$, may be used to determine an intersection point P, being the position of the object 9, by which the signal was reflected. The other intersection point between the two circles is outside of the vehicle interior and thus not possible for an object located in the vehicle interior and is further not located within the active sectors of the transmitters 5a, 7a and receivers 5b, 7b.

If instead using two transmitters $T_1$, $T_2$ and one receiver R, the two distances, $d_1$ and $d_2$, would be represented by the distance from the transmitters $T_1$, $T_2$ to the object located in the position P. See FIG. 4b. The position P is determined as described above for FIG. 4a.

If using one transmitter T and two receivers $R_1$, $R_2$, the two distances, $d_1$ and $d_2$, would be represented by the distance from the object located in the position P to the receivers $R_1$, $R_2$. See FIG. 4c. The position P is determined as described above for FIG. 4a.

FIGS. 4 and 5 illustrate determining the position P in two dimensions. However, the interior of the vehicle 1 is a three-dimensional space. In order to be able to use two-dimensional geometry for a three-dimensional space, it may be assumed that there is a theoretical plane in the vehicle. The position of the object 9 is then determined as its projection on the plane. The plane may be determined by the level of the vehicle seats. Alternatively, the plane may be determined relative to reference points of the vehicle seats, which are defined by the positioning of a manikin as defined by the Society of Automotive Engineers (SAE). As another alternative, the plane may be given by a plane going through the at least three components. In the embodiment with two transceivers 5, 7, as is illustrated in FIGS. 1 and 5, the plane may be a horizontal plane through the two transceivers 5, 7. A projection on the plane, resulting in a two-dimensional position P on that plane, will differ from the real position given in three dimensions. However, the projection will give an estimate, which for many applications is sufficient, especially when having in mind that it is most likely that the person will be located in one of the seats.

In addition to assuming a plane, or as a complement, it may be assumed that the living being 9 is located in one of the vehicle seats. It may then be checked for which seat the determined distances, $d_1$ and $d_2$, and/or the intersection points of the circle, fit best.

Figure 6A:
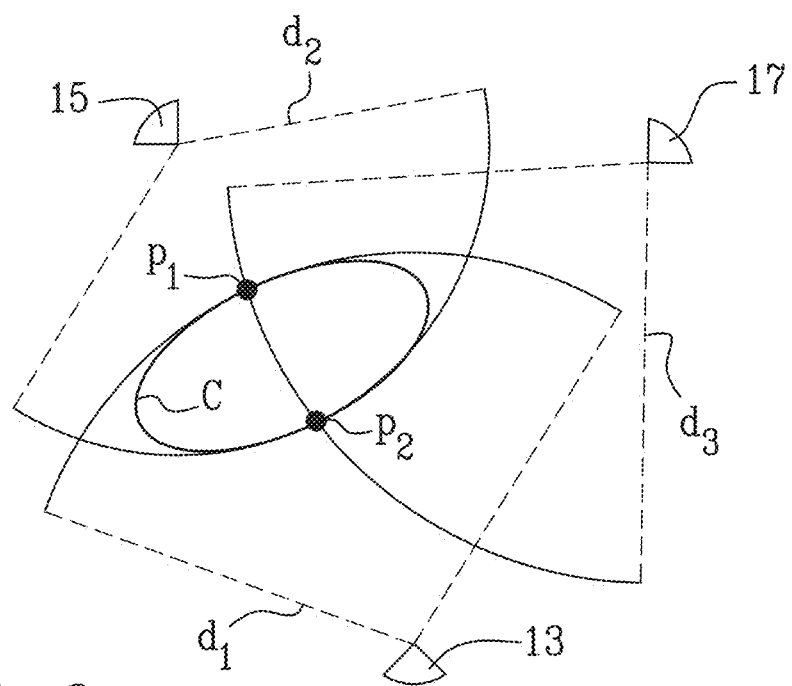
Figure 6B:
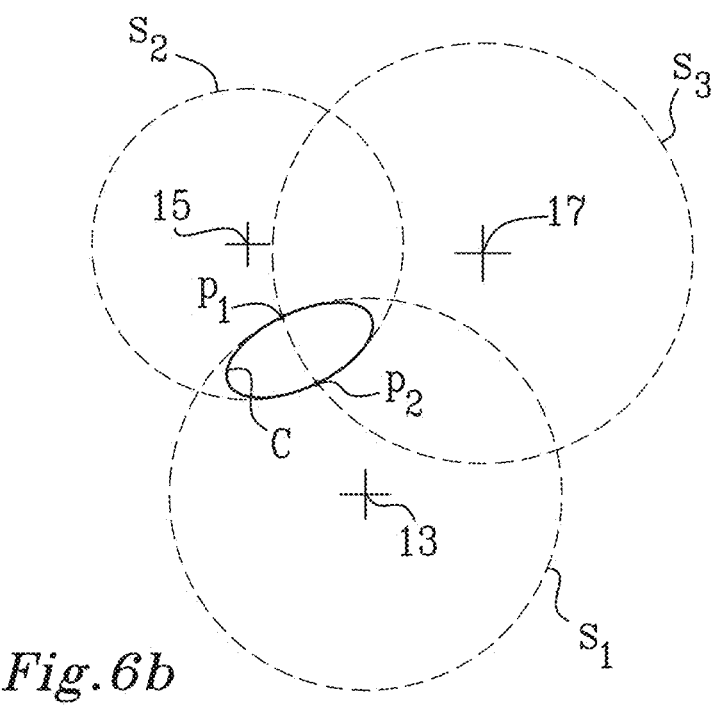

As an alternative to using a two-dimensional geometry as described above, three-dimensional geometry may be used. The position of the object may be then determined in three dimensions as illustrated by the geometry of FIGS. 6a and 6b.

A first signal is transmitted from the first transceiver 13 and a first distance $d_1$ to the object is determined. A first sphere $S_1$ having the radius of the first distance $d_1$ is assumed. Similarly, a second signal is transmitted from the second transceiver 15 and a second distance $d_2$ to the object is determined. A second sphere $S_2$ having the radius of the second distance $d_2$ is assumed. The first sphere $S_1$ and the second sphere $S_2$ intersect with each other along a circle C, when seen in three dimensions.

In some embodiments of the disclosure, the resolution of the determining of the position is sufficient, if it can be concluded that the object is located somewhere along the circle C. The location of the circle C may be compared to the location of the seats in the vehicle 1.

In order to refine the determining of the position, a third transceiver 17 may be used. A third signal is transmitted from the third transceiver 17 and a third distance $d_3$ to the object is determined. A third sphere $S_3$ having the radius of the third distance $d_3$ is assumed. The third sphere $S_3$ intersects the circle C at two points $P_1$ and $P_2$. The points $P_1$ and $P_2$ fulfil that they are at the first distance $d_1$ from the first transceiver 13, at the second distance $d_2$ from the second transceiver 15 and at the third distance $d_3$ from the third transceiver 17. In order to determine in which of the points $P_1$, $P_2$ the object is located, the positions of the points $P_1$, $P_2$ may be compared to the location of the vehicle seats, since it is most likely that the person is located in a seat. It may also be sufficient to know that the person is in either of the points $P_1$, $P_2$, since they are usually quite close. It may be further be checked if both the points $P_1$, $P_2$ are located in the interior of a vehicle and/or located within the active sectors of the transmitter/s and the receiver/s.

It would also be possible, not illustrated, to use a fourth transceiver having its associated sphere in order to determine one point of intersection of all four spheres.

Figure 7:
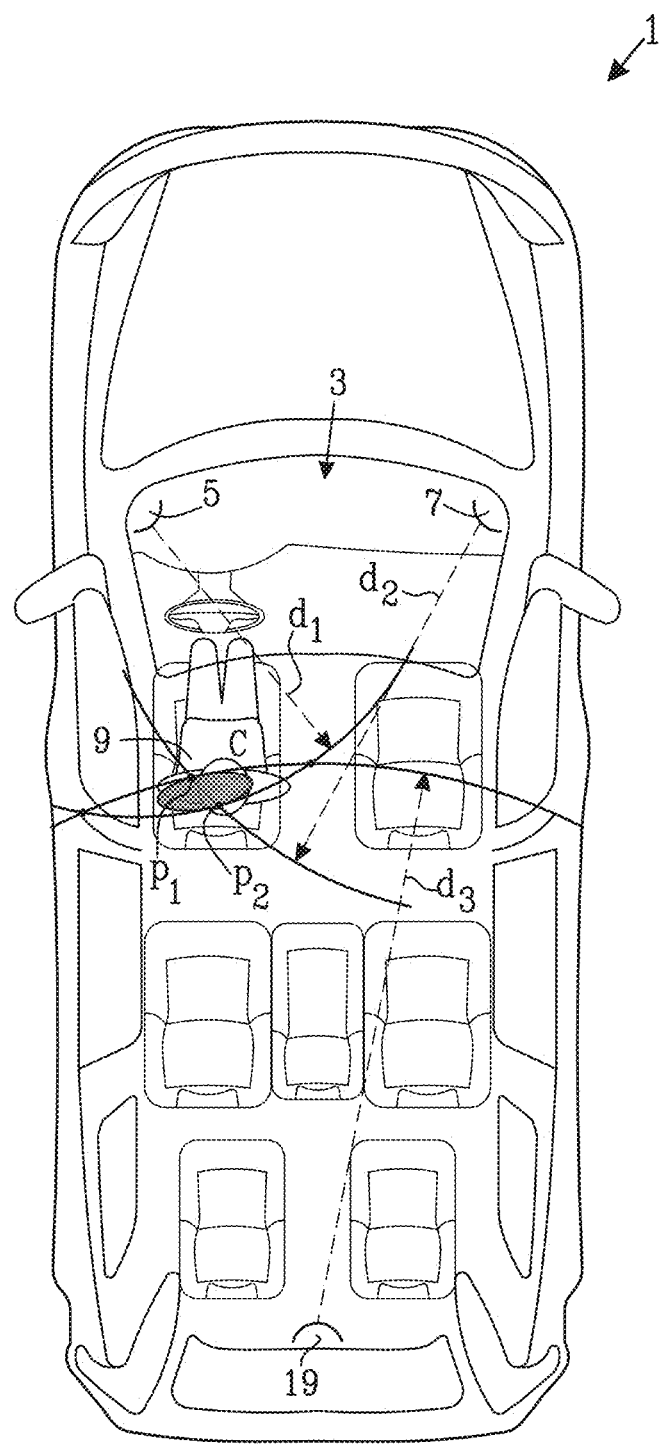
FIG. 7 illustrates the method of FIG. 6a-b applied in a vehicle according to the disclosure.

FIG. 7 illustrates the geometry of FIGS. 6a-6b applied in the vehicle 1 of FIG. 1, which in the illustrated embodiment in addition is equipped with a third transceiver 19 located at the rear of the vehicle interior. The sphere $S_1$ of the first transceiver 5 intersects with the sphere $S_3$ of the third transceiver 19 along the circle C. Any point along the circle C fulfil that it is at the first distance $d_1$ from the first transceiver 5 and at the third distance $d_3$ from the third transceiver 19, i.e. the object 9, by which the signal is reflected, is located somewhere along the circle C. In the illustrated case, the first transceiver 5 and third transceiver 19 were chosen, since the circle C is smaller than a corresponding intersection circle of the first sphere $S_1$ and second sphere $S_2$ would be. The second sphere $S_2$ associated with the signal sent from the second transceiver 7 intersects with the circle C at the points $P_1$ and $P_2$. The object 9 is hence located in either of the points $P_1$ and $P_2$. In order to determine which of the points $P_1$, $P_2$, the points $P_1$, $P_2$ may be compared to the location of the seats, since it is most likely that the person is located in a seat. It may also be sufficient to know that the person is in either of the points $P_1$, $P_2$, since they are usually quite close. As an alternative, a fourth transceiver may be used, the associated sphere of which, not illustrated, would intersect either $P_1$ or $P_2$.

Similar to the two-dimensional case, if instead using three transmitters and one receiver, the three distances, $d_1$, $d_2$ and $d_3$ would be represented by the distance from the transmitter to the object. If using one transmitter and three receivers the three distances $d_1$, $d_2$ and $d_3$ would be represented by the distance from the object to the receiver. In either case, the signal paths associated with the respective distances are, at least partly, different from each other.

Figure 8A:
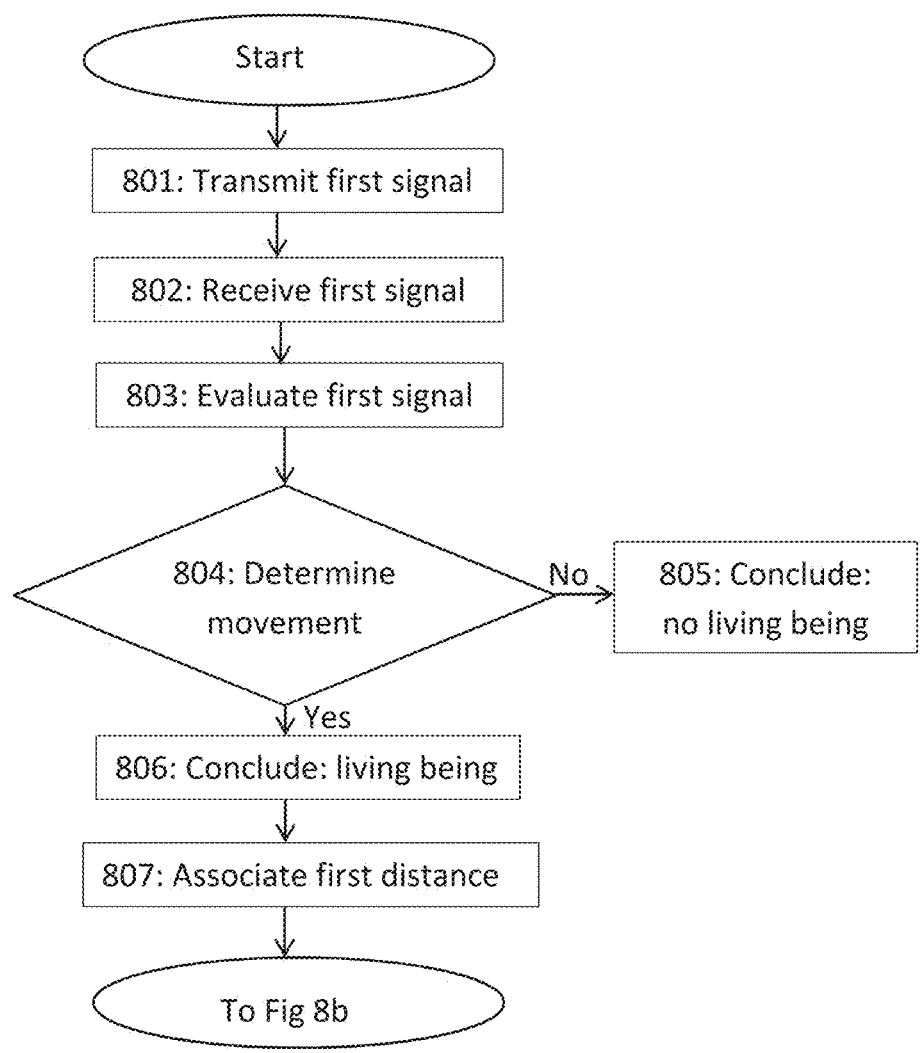
FIG. 8a-b is a flow chart of a method according the disclosure for the vehicle of FIG. 5.

FIGS. 8a and b is a flowchart of a method for determining a position of a first living being in an interior of a vehicle according to the disclosure. The method corresponds to the geometry shown in FIGS. 4 and 5.

The method comprises:

801: transmitting a first signal into the interior of the vehicle,

802: receiving the first signal after reflecting by a first object,

803: evaluating the received first signal,

804: from the evaluation determining if there is a movement associated with the first object, 805/806: from the movement drawing a conclusion that the first object is a first living being, 806, or not a living being, 805

807: associating the first movement of the first object with a first distance,

808: transmitting a second signal into the interior of the vehicle,

809: receiving the second signal after reflecting by a second object, wherein the second signal is transmitted from another position than the first signal is transmitted and/or the second signal is received in another position than the first signal is received, 810: evaluating the received second signal, 811: from the evaluation determining if there is a second movement associated with the second object and drawing the conclusion that the second object is a living being, 813, or no movement and drawing the conclusion that the second object is no living being, 812

814: associate the second movement of the second object with a second distance,

815: compare the first movement to the second movement,

816/817: if a comparison shows that the first movement corresponds to the second movement, drawing a conclusion that the second object is the first living being, 817, otherwise conclude that it is not the first living being, 816

818: using the first and second distances for determining the position of the first living being.

Steps 801-807 relate to the first signal and steps 808-814 to the second signal. Steps 808-814 may be performed before, in parallel to, or after steps 801-807.

Figure 9:
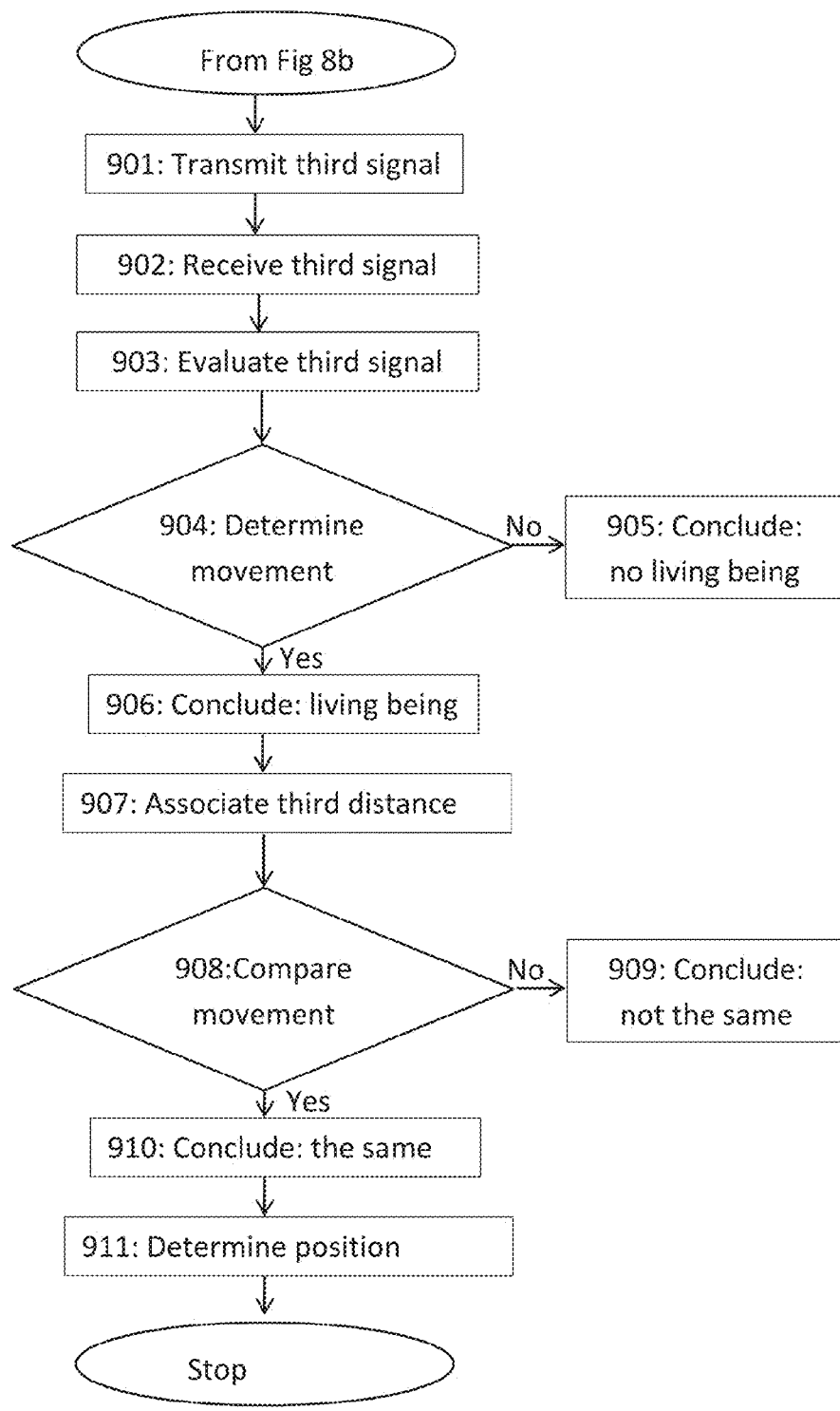
FIG. 9 is a flow chart of optional additional method steps.

In an embodiment utilizing three different signals, see FIG. 9, corresponding to the geometry of FIGS. 6a, 6b and 7, the method further comprises:

901: transmitting a third signal into the interior of the vehicle,

902: receiving the third signal after reflecting by a third object, wherein the third signal is transmitted from another position than the first signal and second signals are transmitted and/or the third signal is received in another position than the first and second signals are received, 903: evaluating the received third signal, 904: from the evaluation determining if there is a third movement associated with the third object, 906, or not, 905

907: associate the third movement of the third object with a third distance,

908: compare the first, second and third movements,

910: if a comparison shows that the first, second and third movements correspond to each other, drawing a conclusion that the third object is the first living being, otherwise concludes that it is not the first living being, 909, 911: using the first, second and third distances for determining the position of the first living being, e.g. by trilateration as described above.

Steps 901-907 relate to the third signal. The steps 901-907 relating to the third signal may be performed in parallel to the steps relating to the first signal 801-807 and/or the steps relating to the second signal 808-814. Alternatively, the steps 901-907 relating to the third signal may be performed after the steps relating to the first signal 801-897 and/or second signal 808-814. If using three different signals as illustrated by FIG. 9, the steps of comparing the first and second signals and determining a position from that, steps 815-818, may be omitted, such that the comparison is made in steps 908-910 of all three signals.

Figure 10:
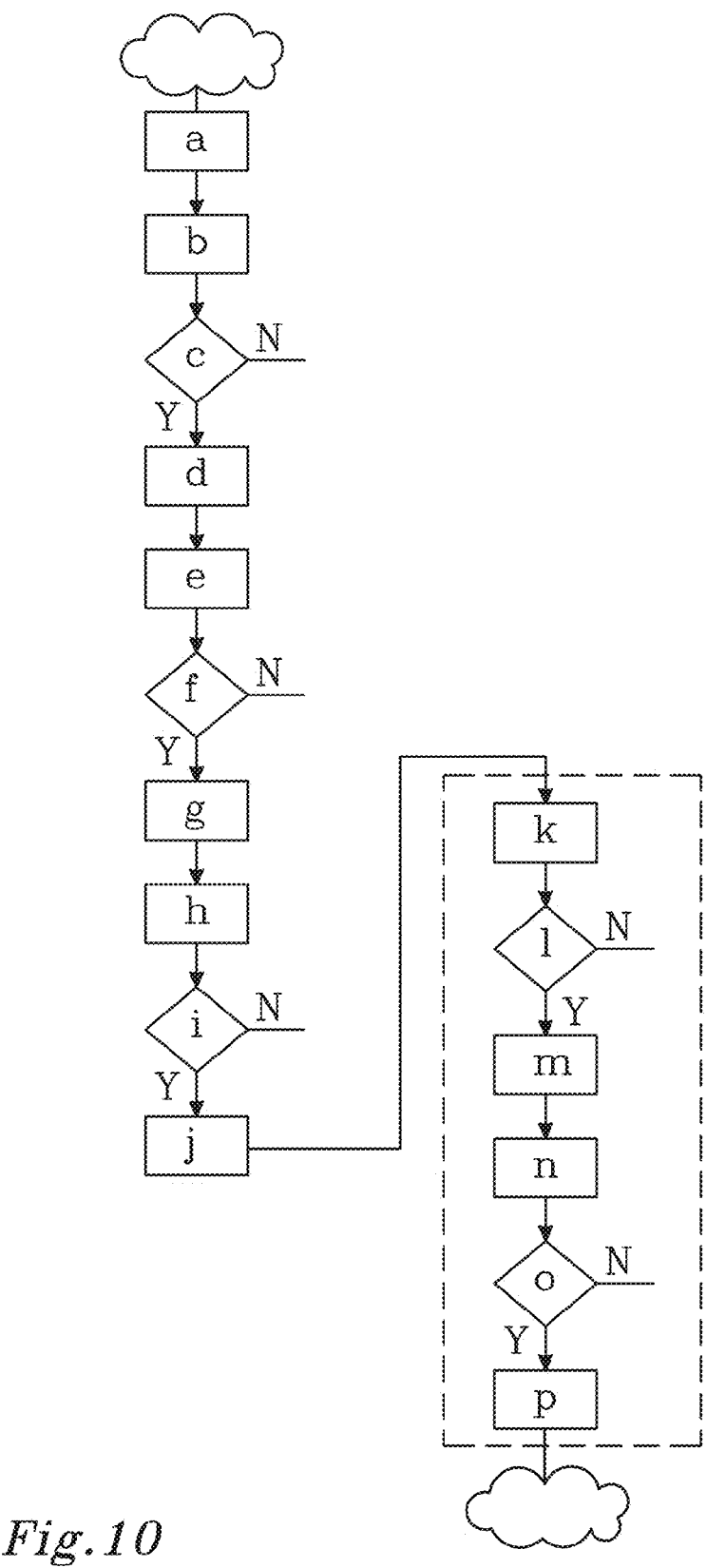
FIG. 10 is a flow chart of a method according the disclosure.

FIG. 10 is a flow chart of a method according to the disclosure. The method comprises:

a) transmitting a first signal into the interior of the vehicle,
b) receiving a first reflected signal from a first object,
c) determining whether or not the first object is a living being based on the first reflected signal,
d) associating the first object with a first distance,
e) receiving a second reflected signal from a second object, the second reflected signal at least partly following another signal path than the first reflected signal,
f) determining whether or not the second object is a living being based on the second reflected signal,
g) associating the second object with a second distance,
h) comparing the second reflected signal to the first reflected signal,
i) from the comparison determining whether the living being of the second reflected signal is the same as the living being of the first reflected signal,
j) if the same, using the first and second distances for determining the position of the living being.

Figure 8B:
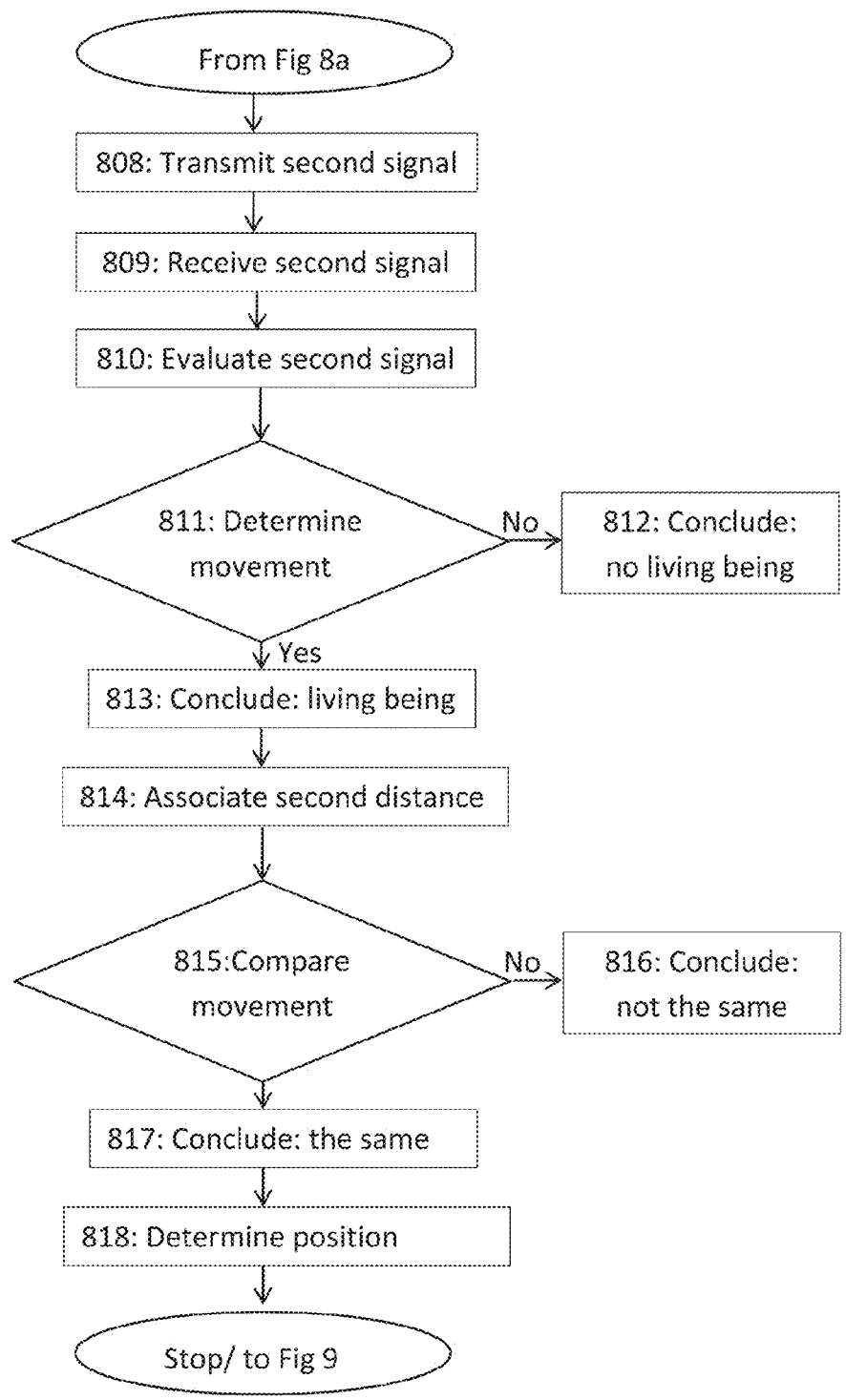

The method may be performed in a system 3 according to above. The method of FIG. 10 is a generalization of the method illustrated in FIGS. 8a, 8b and 9. Steps k)-p), generalizing the method steps of FIG. 9, are optional and will be described below.

Figure 4B:
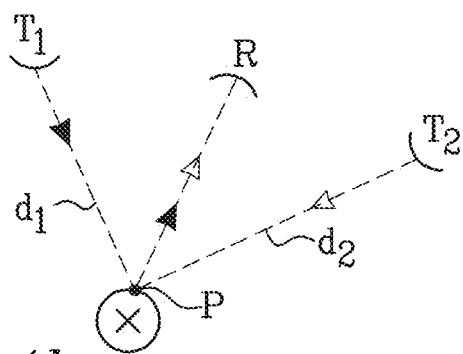
FIG. 4b illustrates an embodiment comprising two transmitters and one receiver.
Figure 4C:
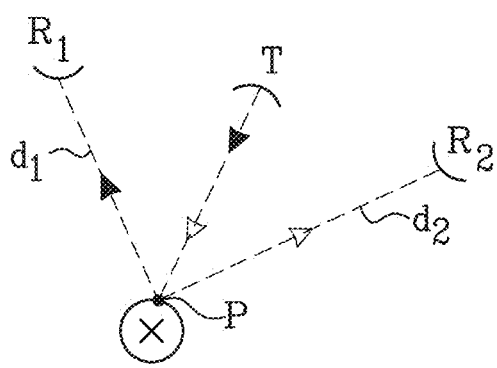
FIG. 4c illustrates an embodiment comprising one transmitter and two receivers.

The second reflected signal may emanate from a second signal transmitted from another position than the first signal is transmitted, e.g. by using two transmitters which are spatially separated, which is illustrated by the flow chart of FIG. 8a and in FIGS. 4a and 4b. As an alternative, or in addition, the second reflected signal may be received in another position than the first reflected signal is received, e.g. by using two receivers which are spatially separated, which is illustrated by the FIGS. 4a and 4c. The second reflected signal may then be transmitted by the same transmitter as the first reflected signal, see FIG. 4c.

The steps relating to the second reflected signal, steps e)-g) may be performed in parallel to the steps relating to the first reflected signal, steps b)-d) or after the steps relating to the first reflected signal, b)-d). The signal path of the first reflected signal is, at least partly, different from that of the second reflected signal. They may differ as regards the paths are followed from the transmitter, to the object, if two transmitters, and/or from the object to the receivers, if two receivers are used. The signal paths may, at least partly, coincide. Normally, the two signal paths have different lengths, even if it is from a geometrical point of view possible that the two signal paths have the same length.

Step d) may be performed before step c). Likewise, step g) may be performed before step f). Step g) may also be performed after steps h) and i).

Step c) and step f) may be performed by determining if there is a movement associated with the first/second object and step h), in that case, being performed by comparing the movement associated with the first object to the movement associated with the second object. See the flow charts of FIGS. 8a and 8b. If the reflected signal is associated with a determined movement, there will also be an associated distance saying at which distance from the transmitter and/or receiver the movement occurred. The movement may be a single movement or a repetitive movement as explained above.

More than one pair of corresponding first and second objects may be determined, each pair being associated with a living being, the determining of the position of the living being of each pair being performed by using the first and second distances being associated with the first and second objects of that pair. For example, there may be two pairs of corresponding movements associated with two different persons being in the vehicle. The number of pairs may be the same as the number of persons in the vehicle.

If using two components of the first component type, the position may be determined in two dimensions.

If using three components of the first component type, the position may be determined in three dimensions. The method may then further comprise:

k) receiving a third reflected signal from a third object, the third reflected signal at least partly following another signal path than the first reflected signal and the second reflected signal,
l) determining whether or not the third object is a living being based on the third reflected signal,
m) associating the third object with a third distance,
n) comparing the third reflected signal to the first reflected signal and the second reflected signal,
o) from the comparison determining whether the living being of the third reflected signal is the same as the living being of the first reflected signal and the second reflected signal,
p) if the same, using the first, second and third distances for determining the position of the living being.

The steps k)-m) relating to the third reflected signal may be performed in parallel to the steps relating to the first reflected signal, steps b)-d), and/or the steps relating to the second reflected signal, steps e)-g). Alternatively, the steps relating to the third reflected signal may be performed after the steps relating to the first reflected signal and/or second reflected signal.

Step m) may be performed before step l). Step m) may also be performed after steps n) and o).

If using three different reflected signals, the steps of comparing the first and second reflected signals and determining a position from that, steps h)-j), may be omitted, such that the comparison is made in one step for all three signals, steps n) and o).

If only two of the three reflected signals correspond, the method described above for the embodiment with two reflected signals may be used, or the steps relating to the non-corresponding signal may be repeated.

It should be noted that the system described herein may further comprise a control unit or controller (not shown). In that regard, the control unit or controller may comprise one or more processors, microprocessors, microcontrollers, application specific integrated circuits (ASIC) and/or other hardware, and/or appropriate software and/or firmware, for use in performing one or more of the various operations, functions and/or steps of the systems and methods described herein. For example, the control unit or controller may comprise one or more processors including associated memory for executing stored computer readable instructions.

Further modifications of the disclosure within the scope of the appended claims are feasible. While exemplary embodiments are described above, it is not intended that these embodiments describe all possible forms of the present disclosure. Rather, the words used in the specification are words of description rather than limitation, and it is understood that various changes may be made without departing from the spirit and scope of the disclosure. Additionally, the features of various implementing embodiments may be combined to form further embodiments of the disclosure.

What is claimed is:

1. A system for determining a position of a living being in an interior of a vehicle, said system comprising:
    at least three components, each one of said at least three components being of a first component type or a second component type, one of said first or second component type being a transmitter and the other being a receiver, two of the components being of said first component type and one of the components being of said second component type, each of said at least three components being adapted to transmit or receive a signal dependent on component type, said signal for use in determining a presence of said living being and for determining a distance ($d_1$, $d_2$) between said living being and each one of said components being of said first component type;
    wherein said at least three components have active sectors, at least two of which are adapted to at least partly overlap within said interior of said vehicle;
    wherein said components of said first component type are adapted to be located at different positions, which positions are known relative to each other; and
    wherein said system is adapted to determine said position of said living being based on said determined distances ($d_1$, $d_2$).

2. The system according to claim 1, wherein said presence of said living being is determined by determining a movement of said living being.

3. The system according to claim 1, wherein said system further comprises a fourth component, which is of said first component type, said components being of said first component type being located at different positions, which are known relative to each other.

4. The system according to claim 1, wherein the relative positions of said components being of said first component type are selected such that a distance between them is at least 10 cm.

5. The system according to any claim 1, wherein said signal is for determining a distance in the range of 0.2-3 meters.

6. The system according to claim 1, wherein the active sector of said components is adapted to comprise at least 30% of the volume of the vehicle interior.

7. The system according to claim 1 comprising a first transceiver comprising at least one component of each one of said first and second component type, and a second transceiver also comprising at least one component of each one of said first and second component type, said second transceiver having a known position relative to said first transceiver.

8. A vehicle comprising a system according to claim 1.

9. A method for determining a position of a living being in an interior of a vehicle using a transmitter, a receiver and a controller, said method comprising:
    a) transmitting a first signal into said interior of said vehicle;
    b) receiving a first reflected signal from a first object;
    c) determining whether or not said first object is a living being based on said first reflected signal;
    d) associating said first object with a first distance;
    e) receiving a second reflected signal from a second object, said second reflected signal at least partly following another signal path than said first reflected signal;
    f) determining whether or not said second object is a living being based on said second reflected signal;
    g) associating said second object with a second distance;
    h) comparing said second reflected signal to said first reflected signal;
    i) from said comparison, determining whether said living being associated with said second reflected signal is the same as said living being associated with said first reflected signal; and
    j) if the same, using said first and second distances for determining the position of said living being.

10. The method according to claim 9, wherein (c) and (f) are performed by determining if there is a movement associated with said first/second object and (h) is performed by comparing the movement associated with said first object to the movement associated with said second object.

11. The method according to claim 9, wherein more than one pair of corresponding first and second objects are determined, each pair being associated with a living being, the determining of the position of the living being of each pair being performed by using said first and second distances being associated with said first and second objects of that pair.

12. The method according to claim 9, wherein said determined position of said living being is used to determine if a vehicle seat is occupied.

13. The method according to claim 9 further assuming a plane of said vehicle, said position of said first living being is determined as its projection on said plane.

14. The method according to claim 9, wherein the determining of said position of said living being is based on the assumption that the living being is located in one of the vehicle seats.

15. The method according to claim 9 further comprising:
    k) receiving a third reflected signal from a third object, said third reflected signal at least partly following another signal path than said first reflected signal and said second reflected signal;
    l) determining whether or not said third object is a living being based on said third reflected signal;
    m) associating said third object with a third distance;
    n) comparing said third reflected signal to said first reflected signal and said second reflected signal;
    o) from said comparison, determining whether or not said living being associated with said third reflected signal is the same as said living being associated with said first reflected signal and said second reflected signal; and
    p) if the same, using said first, second and third distances for determining the position of said living being.

16. The system according to claim 1, wherein the relative positions of said components being of said first component type are selected such that a distance between them is at least at least 30 cm.

17. The system according to claim 1, wherein the relative positions of said components being of said first component type are selected such that a distance between them is at least 50 cm.

18. The system according to claim 1, wherein the relative positions of said components being of said first component type are selected such that a distance between them is at least 100 cm.

19. The system according to claim 1, wherein the active sector of said components is adapted to comprise at least 50% of the volume of the vehicle interior.

20. The system according to claim 1, wherein the active sector of said components is adapted to comprise at least 70% of the volume of the vehicle interior.

\* \* \* \* \*